US009568326B2

(12) United States Patent
Shen

(10) Patent No.: US 9,568,326 B2
(45) Date of Patent: Feb. 14, 2017

(54) ELECTRONIC DEVICE AND METHOD FOR FINDING VEHICLE ACCIDENT

(71) Applicant: FIH (HONG KONG) LIMITED, Kowloon (HK)

(72) Inventor: Kuan-Hung Shen, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 100 days.

(21) Appl. No.: 14/587,814

(22) Filed: Dec. 31, 2014

(65) Prior Publication Data

US 2016/0091327 A1 Mar. 31, 2016

(30) Foreign Application Priority Data

Sep. 26, 2014 (TW) .............................. 103133622 A

(51) Int. Cl.
| G01C 21/34 | (2006.01) |
| G08G 1/0965 | (2006.01) |
| G08G 1/0967 | (2006.01) |
| G08G 1/00 | (2006.01) |
| G01C 21/28 | (2006.01) |
| G01C 21/36 | (2006.01) |

(52) U.S. Cl.
CPC ........... *G01C 21/3407* (2013.01); *G01C 21/28* (2013.01); *G01C 21/362* (2013.01); *G01C 21/3602* (2013.01); *G08G 1/0965* (2013.01); *G08G 1/096791* (2013.01); *G08G 1/205* (2013.01)

(58) Field of Classification Search
CPC ...... G08G 1/0965; G08G 1/087; G08G 1/162; G08G 1/166; G08G 1/205; G08G 1/096716; G08G 1/096791; G08G 1/164; G08G 1/096725
See application file for complete search history.

(56) References Cited

U.S. PATENT DOCUMENTS

| 7,133,767 | B2 * | 11/2006 | Ogino | ................... G01C 21/26 701/400 |
| 7,352,291 | B2 * | 4/2008 | Reumerman | .... G08G 1/096716 340/905 |
| 7,471,236 | B1 * | 12/2008 | Pitt | ........................ G01S 7/003 342/20 |
| 8,208,891 | B2 * | 6/2012 | Jacobs | .................... H04W 4/22 370/310.2 |
| 8,326,258 | B2 * | 12/2012 | Chmielewski | ........ B60R 25/102 340/426.13 |
| 8,330,622 | B2 * | 12/2012 | Stahlin | ............. G08G 1/096716 340/905 |
| 8,331,338 | B2 * | 12/2012 | Stahlin | ..................... G08G 1/04 370/338 |

(Continued)

FOREIGN PATENT DOCUMENTS

DE 102012211568 A1 1/2014

*Primary Examiner* — Truc M Do
(74) *Attorney, Agent, or Firm* — Zhigang Ma

(57) ABSTRACT

An electronic device of an accident vehicle obtains position information of vehicles which fall within a predetermined range of the accident vehicle. The electronic device sends accident information of the accident vehicle to the vehicles which joins a temporary group. The electronic device calculates a driving route for each vehicle according to the accident information and releases the temporary group when the accident vehicle has been processed.

15 Claims, 4 Drawing Sheets

(56) References Cited

U.S. PATENT DOCUMENTS

| | | | | |
|---|---|---|---|---|
| 8,463,290 B2* | 6/2013 | Rhoads | ............... | G08G 1/08 455/421 |
| 8,700,746 B2* | 4/2014 | Imbimbo | ............... | G08G 1/091 709/220 |
| 8,842,021 B2* | 9/2014 | Behm | ............... | G08G 1/0965 340/426.16 |
| 8,923,147 B2* | 12/2014 | Krishnaswamy | ...... | G08G 1/093 370/252 |
| 9,111,447 B2* | 8/2015 | Holland | ............... | G08G 1/0965 |
| 9,135,808 B2* | 9/2015 | Johnson | ............... | G08B 25/009 |
| 9,161,189 B2* | 10/2015 | Lorello | ............... | H04M 3/42263 |
| 2002/0198660 A1* | 12/2002 | Lutter | ............... | G08G 1/0965 701/301 |
| 2004/0246144 A1* | 12/2004 | Siegel | ............... | G08G 1/0965 340/902 |
| 2005/0209770 A1* | 9/2005 | O'Neill | ............... | G06Q 10/06 701/117 |
| 2005/0267651 A1* | 12/2005 | Arango | ............ | G08G 1/096811 701/3 |
| 2005/0282518 A1* | 12/2005 | D'Evelyn | ............. | H04Q 3/0029 455/404.1 |
| 2006/0184319 A1* | 8/2006 | Seick | ............... | G01C 21/28 701/533 |
| 2012/0310518 A1* | 12/2012 | Chen | ............... | G08G 1/162 701/301 |
| 2013/0083679 A1* | 4/2013 | Krishnaswamy | ...... | G08G 1/093 370/252 |
| 2013/0229289 A1* | 9/2013 | Bensoussan | ........... | B60Q 5/006 340/902 |
| 2014/0167954 A1* | 6/2014 | Johnson | ............... | G08B 27/001 340/539.11 |
| 2015/0170429 A1* | 6/2015 | Denny | ............... | B60W 30/09 701/36 |

* cited by examiner

ELECTRONIC DEVICE AND METHOD FOR FINDING VEHICLE ACCIDENT

CROSS-REFERENCE TO RELATED APPLICATIONS

This application claims priority to Taiwanese Patent Application No. 103133622 filed on Sep. 26, 2014, the contents of which are incorporated by reference herein.

FIELD

Embodiments of the present disclosure relate to network technology, and particularly to an electronic device and a method for finding an vehicle that has been in an accident

BACKGROUND

If a vehicle accident (for example, a two vehicle collision) occurs on a busy road, a rescue vehicle (for example, an ambulance) may take a long time to reach the accident because of traffic jams caused by the vehicle accident.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
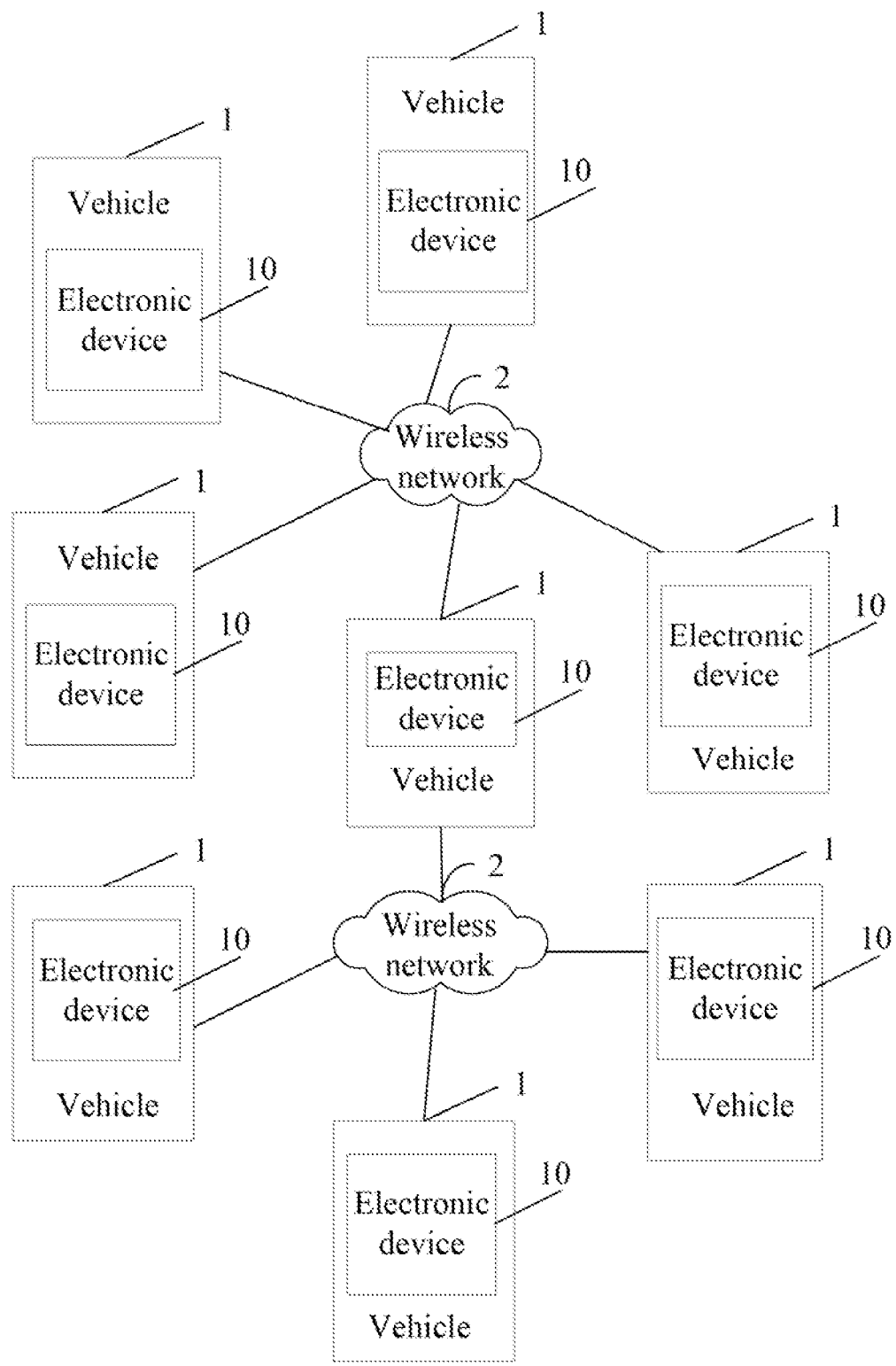
FIG. 1 is a block diagram of an example embodiment of vehicles connected to each other using electronic devices and a wireless network.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY™, flash memory, and hard disk drives. The term "comprising" means "including, but not necessarily limited to"; it specifically indicates open-ended inclusion or membership in a so-described combination, group, series and the like.

FIG. 1 is a block diagram of an example embodiment of vehicles 1 connected to each other using electronic devices 10 and a wireless network 2. In the example embodiment, each vehicle 1 includes an electronic device 10. The electronic device 10 can be attached to the vehicle 1. The electronic device 10 of each vehicle 1 is connected to the wireless network 2, so that the vehicles 1 can communicate with each other. The vehicle 1 can be, but is not limited to, a motorcycle, a car, a truck, a van, a bus or the like. The electronic device 10 can be, but is not limited to, a mobile phone, a tablet computer, a personal digital assistant (PDA), a personal computer or any other electronic devices which provide functions of network connections. The wireless network 2 can be, but is not limited to, a wireless personal area network (PAN), a wireless local area network (LAN), a wireless mesh network, a wireless metropolitan area network, a wireless wide area network (WAN), a cellular network or the like. In addition, if a vehicle 1 has an accident, for example, if the vehicle 1 has a flat on a road, the vehicle 1 is regarded as an accident vehicle.

Figure 2:
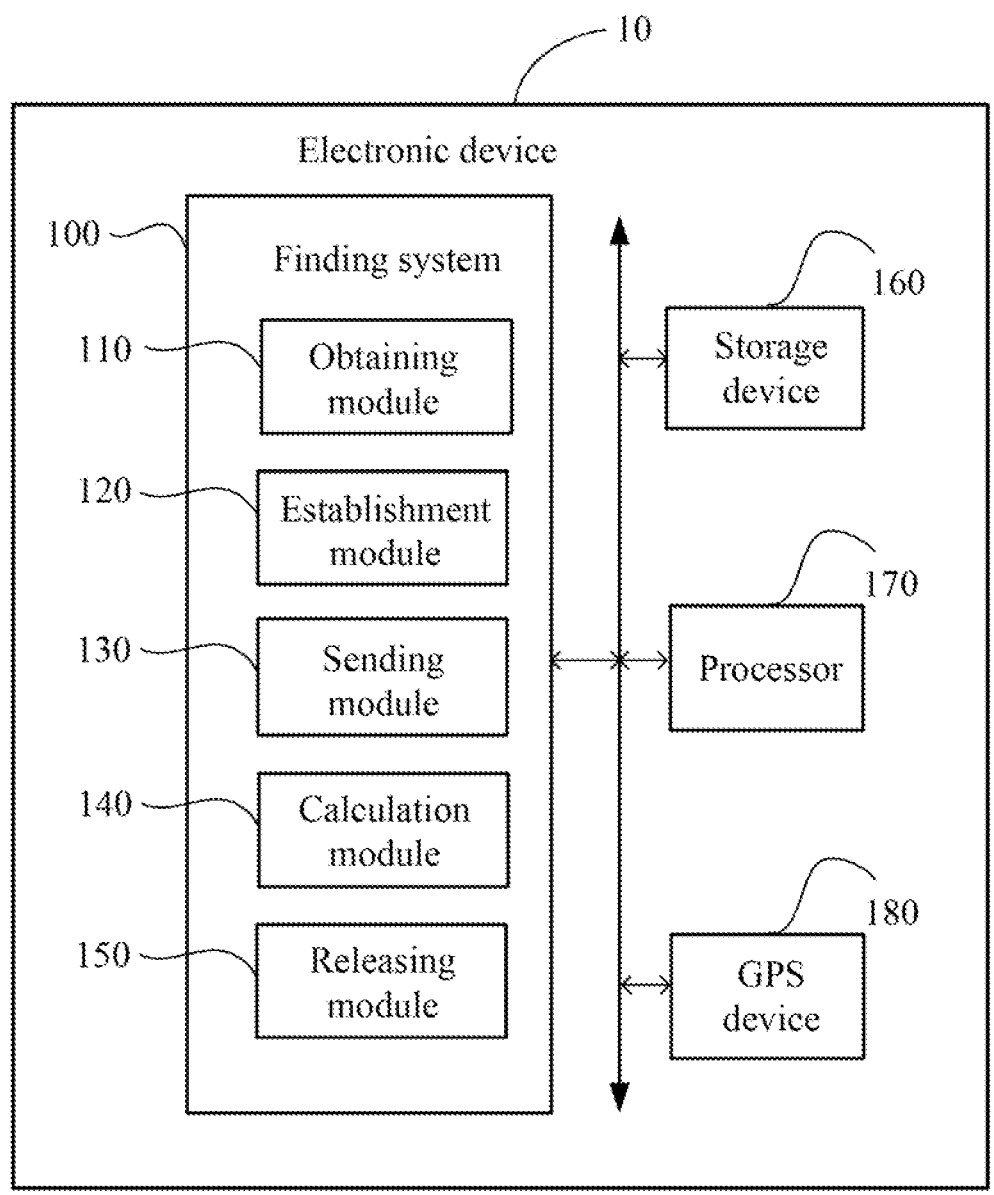
FIG. 2 is a block diagram of one embodiment of a finding system in an electronic device of a vehicle.

FIG. 2 is a block diagram of one embodiment of a finding system 100 in each electronic device 10. The electronic device 10 includes, but is not limited to, a finding system 100, a storage device 160, at least one processor 170, and a global positioning system (GPS) device 180. The GPS device 180 is used to obtain position information of the vehicle 1. FIG. 2 illustrates only one example of the electronic device 10, and other examples can comprise more or fewer components that those shown in the embodiment, or have a different configuration of the various components.

In one embodiment, the storage device 160 can be an internal storage device, such as a flash memory, a random access memory (RAM) for temporary storage of information, and/or a read-only memory (ROM) for permanent storage of information. The storage device 160 can also be an external storage device, such as an external hard disk, a storage card, or a data storage medium. The at least one processor 170 can be a central processing unit (CPU), a microprocessor, or other data processor chip that performs functions of the electronic device 10.

The finding system 100 comprises, but is not limited to, an obtaining module 110, an establishment module 120, a sending module 130, a calculation module 140, and a releasing module 150. Modules 110-150 can comprise computerized instructions in the form of one or more computer-readable programs that can be stored in a non-transitory computer-readable medium, for example the storage device 160, and executed by the at least one processor 170 of the electronic device 10. A detailed description of the functions of the modules 110-150 is given below in reference to FIG. 4.

Figure 4:
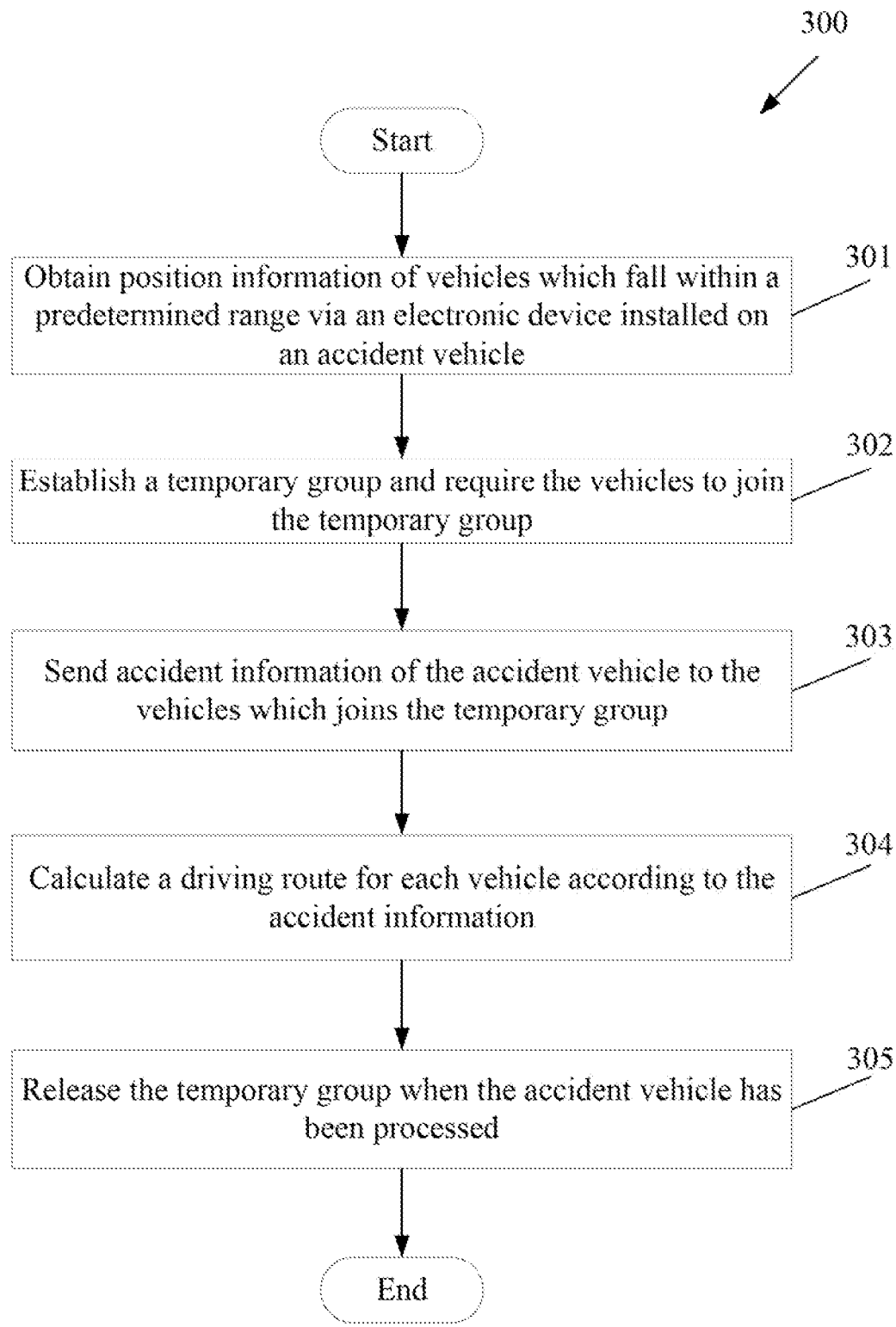
FIG. 4 is a flowchart of an example embodiment of a method for finding an accident vehicle.

FIG. 4 illustrates a flowchart of an example embodiment of a method for finding an accident vehicle. In an example embodiment, the method is performed by execution of computer-readable software program codes or instructions by at least one processor of the electronic device, and can touch an electronic device by a finger of a user or a stylus.

Referring to FIG. 4, a flowchart is presented in accordance with an example embodiment. The method 300 is provided by way of example, as there are a variety of ways to carry out the method. The method 300 described below can be carried out using the configurations illustrated in FIGS. 1-2 and 4, for example, and various elements of these figures are referenced in explaining method 300. Each block shown in FIG. 4 represents one or more processes, methods, or subroutines, carried out in the method 300. Furthermore, the illustrated order of blocks is illustrative only and the order of the blocks can be changed. Additional blocks can be added or fewer blocks can be utilized without departing from this disclosure. The example method 300 can begin at block 301.

At block 301, an obtaining module obtains position information of vehicles 1 which fall within a predetermined range of the accident vehicle. The predetermined range of the accident vehicle can be an area predetermined by a predetermined radius of the area, and a center point of the area is a position of the accident vehicle. The predetermined radius of the area is manually predetermined by a driver of the accident vehicle, for example, the radius of the circle area may be 500 meters. In one embodiment, if the accident vehicle has an accident, for example, the accident vehicle is broken down on the road; the obtaining module obtains the position information from the wireless network 2 of the vehicles 1 which fall in the predetermined range.

At block 302, an establishment module establishes a temporary group and requires the vehicles 1 to join the temporary group. In one embodiment, the temporary group is administrated by the accident vehicle, so that the accident vehicle is capable of sending an invitation to each vehicle 1 which falls within the predetermined range. The invitation can be a dialog box including two buttons which are an accept button and a reject button, the dialog box is shown on a displaying device of the electronic device 10 of the vehicle 1. The vehicle 1 which falls within the predetermined range joins the temporary group after the vehicle 1 accepts the invitation. The vehicle 1 accepts the invitation by the driver of the vehicle 1 manually clicking the accept button using a finger or a stylus. In addition, the vehicle 1 accepts the invitation by speech recognition, for example, the driver of the vehicle 1 speaks "accept" and the vehicle 1 accepts the invitation.

At block 303, a sending module 130 sends accident information of the accident vehicle to the vehicles 1 which joins the temporary group. The accident information of the accident vehicle includes position information of the accident vehicle, road information where the accident vehicle is, a plate number of the accident vehicle, and a video captured by a car recorder of the accident vehicle.

Figure 3:
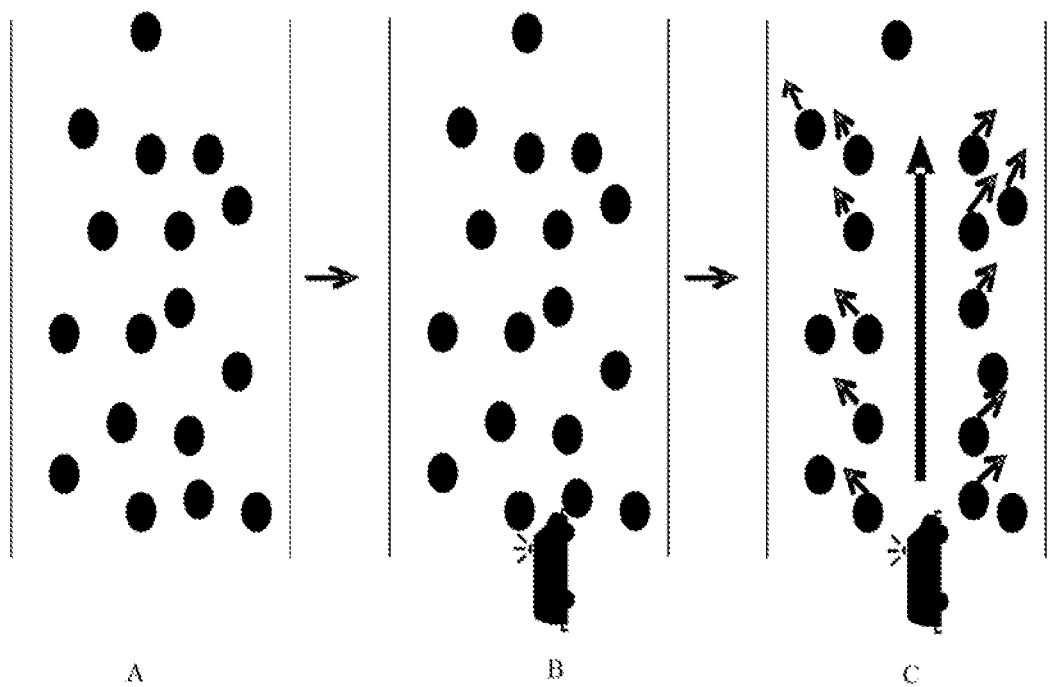
FIG. 3 shows a diagrammatic view of an example of calculating a driving route for each vehicle to generate a rescue route for a rescue vehicle.

At block 304, a calculation module calculates a driving route for each vehicle according to the accident information. In one embodiment, the driving route is used for keeping away from the position of the accident vehicle. After each vehicle 1 follows the driving route, a rescue route is generated for the rescue vehicle (for example, an ambulance) to rescue the accident vehicle. As shown in FIG. 3, site A is a situation which does not have any accidents, site B is a situation when an ambulance is driving to the predetermined range of the accident vehicle, and site C is a situation which has the rescue route for the ambulance when each vehicle 1 calculates the driving route.

At block 305, a releasing module releases the temporary group when the accident vehicle has been processed. In at least one embodiment, the accident vehicle is cleaned up from the road, the temporary group is released. In at least another embodiment, if the accident vehicle falls outside the predetermined range, the temporary group is released.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. An electronic device of an accident vehicle, the electronic device comprising:
   at least one processor; and
   a storage device that stores one or more programs, which when executed by the at least one processor, cause the at least one processor to:
   obtain position information of vehicles within a predetermined range of the accident vehicle, the vehicles connected to the accident vehicle using a wireless network;
   establish a temporary group and require the vehicles to join the temporary group;
   send accident information of the accident vehicle to the vehicles which join the temporary group;
   calculate a driving route for each vehicle according to the accident information;
   generate a rescue route for a rescue vehicle to rescue the accident vehicle when the vehicles follow the driving route; and
   release the temporary group when the accident vehicle has been processed, wherein the temporary group is released when the accident vehicle is removed from the road or the accident vehicle falls outside the predetermined range.

2. The electronic device of claim 1, wherein the predetermined range of the accident vehicle is a circle area predetermined by a predetermined radius of the circle area, and a center point of the circle area is a position of the accident vehicle.

3. The electronic device of claim 1, wherein the temporary group is administrated by the accident vehicle, and the accident vehicle is capable of sending an invitation to each vehicle which falls within the predetermined range.

4. The electronic device of claim 3, wherein each vehicle which falls within the predetermined range joins the temporary group after the vehicle accepts the invitation.

5. The electronic device of claim 1, wherein the accident information of the accident vehicle comprises position information of the accident vehicle, road information where the accident vehicle is, a plate number of the accident vehicle, and a video captured by a car recorder of the accident vehicle.

6. A computer-based method for finding an accident vehicle, the method comprising:
   obtaining position information of vehicles within a predetermined range of the accident vehicle, the vehicles connected to the accident vehicle using a wireless network;
   establishing a temporary group and requiring the vehicles to join the temporary group;
   sending accident information of the accident vehicle to the vehicles which join the temporary group;

calculating a driving route for each vehicle according to the accident information;

generating a rescue route for a rescue vehicle to rescue the accident vehicle when the vehicles follow the driving route; and releasing the temporary group when the accident vehicle has been processed, wherein the temporary group is released when the accident vehicle is removed from the road or the accident vehicle falls outside the predetermined range.

7. The method of claim 6, wherein the predetermined range of the accident vehicle is a circle area predetermined by a predetermined radius of the circle area, and a center point of the circle area is a position of the accident vehicle.

8. The method of claim 6, wherein the temporary group is administrated by the accident vehicle, and the accident vehicle is capable of sending an invitation to each vehicle which falls within the predetermined range.

9. The method claim 8, wherein each vehicle which falls within the predetermined range joins the temporary group after the vehicle accepts the invitation.

10. The method of claim 6, wherein the accident information of the accident vehicle comprises position information of the accident vehicle, road information where the accident vehicle is, a plate number of the accident vehicle, and a video captured by a car recorder of the accident vehicle.

11. A non-transitory computer-readable medium having stored thereon instructions that, when executed by at least one processor of an electronic device of an accident vehicle, causing the processor to perform a method for finding the accident vehicle, the method comprising:

obtaining position information of vehicles within a predetermined range of the accident vehicle, the vehicles connected to the accident vehicle using a wireless network;

establishing a temporary group and requiring the vehicles to join the temporary group;

sending accident information of the accident vehicle to the vehicles which join the temporary group;

calculating a driving route for each vehicle according to the accident information;

generating a rescue route for a rescue vehicle to rescue the accident vehicle when the vehicles follow the driving route; and releasing the temporary group when the accident vehicle has been processed, wherein the temporary group is released when the accident vehicle is removed from the road or the accident vehicle falls outside the predetermined range.

12. The non-transitory computer-readable medium of claim 11, wherein the predetermined range of the accident vehicle is a circle area predetermined by a predetermined radius of the circle area, and a center point of the circle area is a position of the accident vehicle.

13. The non-transitory computer-readable medium of claim 11, wherein the temporary group is administrated by the accident vehicle, and the accident vehicle is capable of sending an invitation to each vehicle which falls within the predetermined range.

14. The non-transitory computer-readable medium of claim 13, wherein each vehicle which falls within the predetermined range joins the temporary group after the vehicle accepts the invitation.

15. The non-transitory computer-readable medium of claim 11, wherein the accident information of the accident vehicle comprises position information of the accident vehicle, road information where the accident vehicle is, a plate number of the accident vehicle, and a video captured by a car recorder of the accident vehicle.

* * * * *